(12) United States Patent
Humphreys

(10) Patent No.: US 8,969,759 B2
(45) Date of Patent: Mar. 3, 2015

(54) APPARATUS AND METHOD FOR PERFORATING MATERIAL

(75) Inventor: Bryan Humphreys, Durham (GB)

(73) Assignee: CAV Advanced Technologies Limited, Durham (GB)

( * ) Notice: Subject to any disclaimer, the term of this patent is extended or adjusted under 35 U.S.C. 154(b) by 489 days.

(21) Appl. No.: 13/145,937

(22) PCT Filed: Jan. 20, 2010

(86) PCT No.: PCT/GB2010/050078
§ 371 (c)(1),
(2), (4) Date: Sep. 7, 2011

(87) PCT Pub. No.: WO2010/084345
PCT Pub. Date: Jul. 29, 2010

(65) Prior Publication Data
US 2011/0309059 A1    Dec. 22, 2011

(30) Foreign Application Priority Data
Jan. 22, 2009   (GB) .................... 0901002.6

(51) Int. Cl.
*B23K 26/382* (2014.01)
*B23K 26/14* (2014.01)
(Continued)

(52) U.S. Cl.
CPC ........... *B23K 26/381* (2013.01); *B23K 26/0823* (2013.01); *B23K 26/0838* (2013.01); *B23K 26/0846* (2013.01); *B23K 2201/16* (2013.01);
(Continued)

(58) Field of Classification Search
CPC ........... B23K 26/0823; B23K 26/0838; B23K 26/0846; B23K 26/381; B23K 26/4005; B23K 26/4015; B23K 26/402; B23K 26/4085; B23K 2201/16; B23K 2203/04; B23K 2203/10; B23K 2203/14
USPC .................. 219/121.7, 121.71; 264/400, 482; 226/196.1, 189; 242/615.2, 615, 242/615.21
See application file for complete search history.

(56) References Cited

U.S. PATENT DOCUMENTS 3,586,229 A * 6/1971 Kamada et al. ............... 226/189
3,742,182 A * 6/1973 Saunders .................. 219/121.71
(Continued)

FOREIGN PATENT DOCUMENTS

EP          0234805 A1      9/1987
JP       60-187492 A  *     9/1985
(Continued)

OTHER PUBLICATIONS

Machine translation of WO 2005/070,240, Oct. 2013.*
(Continued)

*Primary Examiner* — Geoffrey S Evans
(74) *Attorney, Agent, or Firm* — Winstead PC

(57) ABSTRACT

An apparatus for creating a hole in solid sheet material (1) by laser beam irradiation is described comprising a source of laser radiation; a focusing apparatus (11) for impinging a beam of laser radiation from the source onto a surface of solid sheet material (1) in which holes are to be formed in use; and a holding device (7) for holding said solid sheet material (1); wherein the holding device (7) is structured to hold the sheet material (1) in use in an arcuate configuration. A method of creating a hole in solid sheet material making use of such an arcuate configuration is also described.

28 Claims, 5 Drawing Sheets

(51) Int. Cl.
　　*B23K 26/38*　　(2014.01)
　　*B23K 26/08*　　(2014.01)
　　*B23K 26/40*　　(2014.01)

(52) U.S. Cl.
　　CPC ......... *B23K 26/4005* (2013.01); *B23K 26/4015* (2013.01); *B23K 26/402* (2013.01); *B23K 2203/04* (2013.01); *B23K 2203/10* (2013.01); *B23K 26/4085* (2013.01); *B23K 2203/14* (2013.01)
　　USPC ............... 219/121.7; 219/121.71; 219/121.84

(56) References Cited

U.S. PATENT DOCUMENTS

| | | | |
|---|---|---|---|
| 4,377,736 A | | 3/1983 | Daunt et al. |
| 4,507,535 A | * | 3/1985 | Bennett et al. ............ 219/121.71 |
| 4,761,534 A | * | 8/1988 | Foulkes .................... 219/121.67 |
| 4,877,070 A | | 10/1989 | Hayashi |
| 5,117,087 A | * | 5/1992 | Baker et al. ............... 219/121.71 |
| 5,262,612 A | * | 11/1993 | Momany et al. .......... 219/121.67 |
| 6,013,895 A | * | 1/2000 | Steadman ................... 219/121.7 |
| 6,635,111 B1 | * | 10/2003 | Holtmann et al. .......... 226/196.1 |
| 6,693,256 B2 | * | 2/2004 | Furujo et al. .............. 219/121.72 |
| 6,794,604 B2 | * | 9/2004 | Herke et al. ............... 219/121.67 |
| 2003/0192865 A1 | * | 10/2003 | Cole et al. ................ 219/121.67 |
| 2009/0321395 A1 | * | 12/2009 | Hu et al. ................... 219/121.67 |

FOREIGN PATENT DOCUMENTS

JP　　　　01-218792 A　*　8/1989
WO　　WO-2005/070240 A1　　8/2005

OTHER PUBLICATIONS

De Backer, Tom, "International Search Report", for PCT/GB1010/050078, as mailed May 25, 2010, 5 pages.

\* cited by examiner

APPARATUS AND METHOD FOR PERFORATING MATERIAL

This invention relates to a method and apparatus for drilling a perforation in solid material, and in particular solid sheet metal material, by laser beam irradiation. The invention relates particularly, but not exclusively, to the drilling of microholes in aluminium and titanium alloy, stainless steel or other metal or composite sheet material, for example for aerospace components.

To provide effective drag reduction in relation to certain aerospace components for aircraft it is known to drill large arrays of microholes in the sheet structure of the component such as aircraft wing and tail surface leading edges so as to improve laminar flow over the surface to reduce drag. Typically, holes are required of tens of microns in diameter in sheet aluminium and titanium alloys which may be one millimeter thick or more.

The need for large arrays and consistent process control has led to the development of drilling apparatus and methods based on laser beam irradiation. Laser drilling techniques using an excimer laser or a Nd-YAG are known for example. Sheet material is mounted on a suitable support frame and a laser source drilling means is indexed relative to the sheet in two dimensions, for example by movement of the support frame, for example under computer control, to a desired array pattern. A beam is directed in a focused manner, usually normally, at the surface. The incident beam energy removes material by ablation and/or vaporisation in localised manner to create the desired array of microholes.

The characteristic shape and particularly the through profile of a resultant hole depends in particular on sheet thickness, beam energy, beam quality and beam focus characteristics and the temporal energy distribution. To produce consistently controlled through profiles in an area array consistent control of beam focus becomes important. It becomes desirable in particular to maintain close control over the distance between the laser source and the sheet surface and/or to control the focus of the laser source to accommodate variations in the distance between the laser source and the sheet surface.

Waste material produced in the drilling process, especially on the laser impingement side of the solid material, and the manner in which is it dealt with, can be an issue in this regard. Typically this may be dispersed by means of a gas stream directed at the surface of the material under pressure in the vicinity of the area being drilled to clear ablated and/or vaporised material from this vicinity and/or to keep the working head free of debris. The gas also ejects material from the reverse of the sheet as the hole is created and prevents surface tension tending to draw material back to close the hole. The gas stream is typically a relatively inert gas, such as argon.

The gas stream impacts the sheet surface. This may cause it to move and/or flex. This can make it more difficult to hold the accurate focus which is desirable for consistent hole production, as the distance between the laser and the moving sheet surface may be difficult to maintain accurately. For air flow applications in particular, the size, distribution and air flow properties of the holes are critical to performance. Consistency of focus is therefore of significance. The requirement to maintain focus control means that the gas stream flow can be a rate limiting part of the process.

Moreover, the desirability of using a relatively inert gas, such as argon, can make the process expensive.

There is thus a general desire to provide a method and apparatus for drilling a perforation in solid material by laser beam irradiation which at least reduces one or more of the above problems and which enables the drilling of large arrays of holes in a practical time with practical control of consistency of hole diameter, through profile and distribution and at a practical cost for industrial application.

In accordance with the invention in a first aspect, an apparatus for creating a hole in solid sheet material by laser beam irradiation comprises:
  a source of laser radiation;
  a focusing apparatus for impinging a beam of laser radiation from the source onto a surface of solid sheet material in which holes are to be formed in use;
  a holding device for holding said solid sheet material;
  wherein the holding device is structured to hold the sheet material in an arcuate configuration.

In prior art laser drilling apparatus, the sheet is held flat and relative movement between the flat sheet and a normally directed laser beam impinging upon the surface of the sheet is used to create a pattern of drilled holes by laser ablation and/or vaporisation of material. The same general principles for forming holes are exploited by the apparatus of the present invention in use. However, the sheet is held in such a manner as to have an arcuate, rather than a flat planar structure, when mounted on the holding device for the forming of holes.

For a given sheet material and sheet thickness, the arcuate arrangement tends to give greater rigidity to the sheet than a simple planar arrangement. This extra rigidity may reduce the tendency for the sheet material to flex during the hole forming operation. This is a particular advantage where waste material generated by the process is to be dispersed and/or collected by means of a gas stream directed at the surface of the material under pressure. The extra rigidity conferred by the arcuate sheet configuration may reduce the tendency for the sheet to move or flex under the influence of this gas stream. Reducing the tendency of the material to move or flex by mounting it in a more rigid configuration makes it easier to maintain a more accurate control over the distance between the sheet surface and the laser source, and thus a more accurate and consistent focus of beam. The arcuate configuration also prevents buckling and associated "oil canning" due to build up of tensile stress in the plane of the sheet which can be caused by contraction of molten material during cooling around the generally cylindrical surface created for a hole. Potentially, more consistently drilled holes are produced. Potentially, faster throughput rates might be possible without too much loss of consistency of focus and hence of consistency of hole size, shape and properties.

An arrangement whereby the sheet material is carried in an arcuate configuration rather than fully flat is also potentially more compact for a given sheet size, which can for example reduce the footprint of a given piece of apparatus, conferring additional advantages.

The drilled holes are formed in the sheet material through the thickness i.e. the minimum dimension of the sheet material. This may be accomplished in a number of ways. For example, the source of laser radiation may be arranged in use to deliver a beam of laser radiation in a direction substantially perpendicular to a longitudinal axis of the sheet material or may be arranged in use to deliver a beam of laser radiation at an angle of between 10 and 90 degrees to a tangent of an apex of the sheet material.

Alternatively, the holding device may be structured to hold the sheet material relative to the source of laser radiation in use such that a beam of laser radiation deliverable from the source in a direction substantially parallel to a thickness of the sheet material or may be structured to hold the sheet material in use in an arcuate configuration by means of a bending force applied in a direction substantially parallel to a beam of laser radiation deliverable from the source.

The holding device is structured to hold the sheet material in an arcuate configuration, in that the sheet material is no longer presented flat, but it is instead presented during use with a curved surface which is continuously curved in at least one direction. The holding device defines at least a number of holding points where the sheet is engaged sufficient to hold the shape during use. For example, a sheet surface in use is configured to be a cylindrical surface or a part thereof. For example and/or the holding points thereof may define a cylindrical drum or a part thereof. In a particularly convenient configuration, the cylindrical surface or part thereof is a surface of a circular cylinder, but any continuous curve that gives greater rigidity than a simple flat planar configuration may be considered without departing from the principles of the invention. In an alternative configuration, the holding points are in the forms of guides through which the sheet material is feedable.

Usually, a convex surface is presented to a laser working head (that is, when mounted for hole formation the impingement side of the solid material is convex). However, it would also be possible to drill a concave surface (e.g. internally of a cylinder). It will generally be desirable for the holding device and laser source to be so juxtaposed that the focusing apparatus causes a beam of laser radiation from the source to impinge onto a surface of solid sheet material in which holes are to be formed in use in a direction locally substantially normal to the surface but this may not always be the case and some other angle could be preferred.

The holding device is preferably rotatable about a longitudinal axis so as to enable different portions of the sheet surface to be presented selectively to the laser radiation. Additionally or alternatively the holding device is preferably mounted cooperably with the laser source to enable relative movement and especially indexing movement between the sheet surface and the laser source so as to allow the laser beam to impinge selectively on different areas of the sheet surface. For example, the holding device is preferably mounted cooperably with the laser source to enable relative movement therebetween in at least one direction in a plane perpendicular to a beam direction. More preferably, relative movement is enabled across the plane perpendicular to a beam direction for example in two orthogonal directions. Thus, in the preferred case, relative movement in an x, y plane perpendicular to a beam direction and rotation of the holding device together allow different portions of the sheet surface to be presented selectively to the laser radiation to create a suitable array of holes.

Additionally, the holding device and laser source are preferably relatively mounted so as to permit variation of the relative distance between them in a z direction parallel to a beam direction. For example this movement may be used to focus a beam onto a working surface. Typically, the focal length itself does not change. Focusing is achieved by moving the position of the focusing lens (the laser beam is collimated) or by changing the overall laser to workpiece distance if the lens is fixed relative to the laser.

The apparatus preferably further comprises drive means to effect relative movement of the holding device (and thus of the sheet surface) and the laser source, for example in a pair of orthogonal directions perpendicular to a beam direction and/ or via rotation of the holding device so as to present different areas of the surface of the sheet selectively and successively for processing and/or in a direction parallel to a beam direction to vary source/surface distance.

Suitable control means may be provided to control the drive means to effect relative movement of the holding device and laser source, and thus to drill a desired pattern of multiple microholes in familiar manner.

In a preferred embodiment, the holding device is demountable from the apparatus for loading and unloading of sheet material. This may for example enable a sheet to remain loaded on the drum to facilitate other fabrication processes prior to or subsequent to the drilling of the holes.

Conveniently, the laser source is adapted to deliver pulsed radiation onto the surface of the solid sheet material to be drilled.

A suitable laser source includes Nd:YAG laser.

A single source may be adapted in conjunction with the associated focusing apparatus to deliver a single focused beam impinging upon a surface of the solid sheet material, or may, for example by provision of a beam splitter, be adapted to provide plural beams, for example to drill plural holes in a single operation.

Conveniently, the solid sheet material to be drilled is metallic, and is for example a titanium or aluminium alloy, or stainless steel.

The apparatus conveniently further comprises means for dispersing and/or collecting waste material produced by the drilling process. Conveniently, such means includes a gas jet source for blowing a gas jet under pressure across the solid material surface in the vicinity of the volume in which a hole is being formed. The gas jet source is conveniently an inert gas source such as an argon source. The gas jet source may initially clear the surface of the material and/or the laser device clear of debris and ultimately also blow through and clear debris from a drilled hole.

A gas collection system may be provided to collect gas from the gas jet after impingement on the surface of and/or passage through the sheet material, for example to provide a means to collect and extract waste drilling material entrained in the said gas jet. In a particularly convenient embodiment, the gas collection system is adapted to re-circulate gas for reuse.

In a particularly preferred embodiment, the apparatus comprises an environmental enclosure which defines a substantially fluidly isolated environment. This might facilitate the recycling process above, and/or make the process cleaner by effecting containment of the debris produced by laser ablation and/or vaporisation of material during drilling. It is a particular advantage of the arcuate arrangement in which the sheet is held by the apparatus of the present invention that for a given sheet area the structure is inherently likely to be more compact, and therefore more readily contained in this manner.

It will be appreciated that such a substantial fluid containment need not be absolute. The laser drilling process to which the invention relates is not generally carried out under a specifically controlled and isolated atmosphere, in the manner of processes requiring a fully inert atmosphere, or requiring a vacuum. A degree of enclosure which isolates the working volume to a significant degree will still confer advantages.

In accordance with the invention in a further aspect, a method of creating a hole in solid sheet material by laser beam irradiation comprises the steps of:
    mounting the sheet material on a holding apparatus such that it is held in an arcuate configuration;
    irradiating a surface of the solid material with a beam of laser radiation to drill a hole therethrough by ablation and/or vaporisation of the material.

In practice, the above steps are repeated a large plurality of times to drill a plural array of holes.

The hole drilled through the solid material is through the minimum dimension of the sheet material i.e. through it thickness. To achieve this, the beam of laser radiation may be delivered in a direction substantially perpendicular to a longitudinal axis of the sheet material, the beam of laser radiation may be delivered at an angle of between 10 and 90 degrees to a tangent of an apex of the sheet material, the sheet material may be held such that the beam of laser radiation is delivered substantially parallel to a thickness of the sheet material or the sheet material may be held in an arcuate configuration by means of a bending force applied in a direction substantially parallel to the beam of laser radiation.

Preferably, the laser source comprises a source of pulsed laser irradiation which can be successively impinged onto the surface of the solid material at a plurality of multiple locations to drill such a plurality of holes.

Preferably, the method further comprises the step of relative movement of the laser source and the sheet surface between each drilling step so as to drill a plurality of holes. In particular preferably, the step of relative movement comprises relative movement in at least one direction and preferably two orthogonal directions in a plane normal to the direction of the laser beam from the source, for example by effecting movement of the holding means and/or the source. Additionally or alternatively, relative movement comprises rotation of the holding means. Holes can either be drilled when the material is moving or stationery relative to the laser.

Preferably, the relative movement is such that at all times laser radiation is impinged onto the surface of the solid sheet material in a direction substantially normal to the surface.

Conveniently, the method further comprises the step of dispersing and/or collecting waste material by blowing a jet of gas under pressure at the surface of the solid material in the vicinity of the volume being drilled. Preferably the gas is an inert gas, and is for example argon. Preferably the method further comprises collecting the jet of gas subsequent to impingement at the surface of the material for the purposes of extracting waste drilling material entrained in the gas stream and/or for the purposes of recycling the gas.

The method is in particular a method of operation of the apparatus hereinabove described, and additional preferred features of the method will be understood by analogy with reference to the description of the apparatus.

In a preferred embodiment, the apparatus includes a means for dynamic focus adjustment and the method comprises dynamic focus adjustment step.

For example in this embodiment, the apparatus further comprises:
  a distance measurement device to measure distance between a point in fixed relationship to the source of laser radiation and a surface of solid material;
  control means to adjust beam focus dynamically to focus the laser beam based on measurement of distance obtained by the distance measurement device.

For example, a point in fixed relationship to the source of laser radiation is a point on a working head comprising a source of laser radiation. For example the head comprises a housing, at least a portion of the surface of which facing a solid material impingement surface in use is of a low-adhesion or anti-fouling material and/or dielectric material; and a distance measurement device is adapted to measure distance between a fixed point on the housing and a surface of solid material.

In accordance with this embodiment, capacitive coupling between a conductive housing and a solid metal sheet being worked is not used to measure distance. Rather, a separate distance measurement device in fixed relationship with the source and for example associated with a housing of a working head in such manner as to allow measurement of distance between the source and for example a fixed point on the housing and a surface of sheet material in use is substituted. This distance measurement may be used to adjust focusing parameters, for example including the distance between source and surface, the control means being adapted so to act.

At least the forward portion of the housing, facing the impingement surface in use, is preferably of low-adhesion or anti-fouling material, and/or provided with an anti-fouling finish. The housing or finish may be of a dielectric material having low electrical conductivity. Conveniently, at least the forward portion on the laser impingement side, and optionally the entire housing, is moulded from or has a surface finished applied comprising a polymeric material having a low coefficient of adhesion such as PTFE, HDPE. A working head with a small area PTFE forward portion is particularly preferred.

The distance measurement device is configured to measure distance from a fixed point relative to the source. Preferably, the distance measurement device comprises a means to measure the distance from the fixed point to the surface directly.

In one possible alternative the distance measurement device may be a mechanical range finder.

In another possible alternative the distance measurement device may be a remote range finder based on the reception of a returning projected signal from the surface. For example, the distance measurement device may be a light range finder such as a laser range finder. Alternatively for example the device may be an acoustic ranger finder such as an ultrasonic range finder. In each such case, a signal is projected by the device towards the surface of the material to be worked in use and the reflected signal is used to give an indication of distance.

The distance measurement device is preferably fixed relative to the source, and for example to a housing thereof, for example being mounted thereon or integrally formed therewith.

By analogy in this embodiment, the method comprises the additional steps of:
  measuring the distance between a fixed point associated with the source of radiation and the surface of the solid material;
  irradiating a surface of the solid material with a beam of laser radiation directed thereupon from the source, the said beam having been focused in accordance with the distance measurement so obtained.

The method in this embodiment thus involves obtaining a direct distance measurement from a surface of the material to be worked and using this to effect a dynamic adjustment of the focus of the impinging laser beam, to adjust the focus to reflect the distance measurement, and in particular to ensure a consistent focus for consistent production of holes. The method involves adjustment of focus for example by varying the source/material surface distance as desired.

In a preferred embodiment, the apparatus includes a means for monitoring properties of a drilled hole and means to feed this back to vary process parameters, and the method comprises a process parameter adjustment step based on such feedback.

For example in this embodiment, the apparatus further comprises:
  a control module to control process parameters relating to the incident beam for example including at least the power, duration and focus of a beam incident upon a surface of sheet material in use;

a hole monitor adapted to obtain hole property data, for example relating to profile and/or airflow behaviour of a hole, as each hole is created;

a feedback module including a data link to receive hole property data, a comparator to compare hole property data with target data, for example relating to a desired profile/airflow, and a control signal output to output a control signal based on the comparison to the control module to cause the control module to tend to vary process parameters in such manner as to bring hole properties into closer correlation with target hole property data.

Thus, in accordance with the embodiment there is a direct measurement, in process, of a hole property such as the hole profile and/or airflow through the hole, which enables the system, by means of direct feedback into the system, to tend to cause a subsequent hole to be formed in such manner that the hole properties of such a subsequent hole more closely approximate to the target property data. The process is potentially continuous and potentially variable in process, in contrast to more conventional batch hole drilling and batch testing approaches.

Preferably, the hole monitor comprises a light transmitter and receiver to pass light through each hole on creation and obtain information about its profile thereby. For example the light transmitter is a source of coherent light such as a laser. Additionally or alternatively the hole monitor comprises an acoustic transmitter and receiver to pass an acoustic signal through the hole and obtain information thereby about its profile. Conveniently, in either case, information about the profile of the hole includes one or more of its entrance diameter, its exit diameter, its extent at a narrowest point through the sheet thickness, and its profile in a through thickness direction.

Additionally or alternatively a hole monitor comprises a source of gas flow to be directed at a hole once formed, and a gas flow meter to determine gas flow after impingement of incident airflow on the surface at and/or through a hole so formed. The gas flow source and flow meter thus obtain data about airflow properties of the hole directly. The gas flow source may be an inert gas flow source provided to clear/collect debris as above described. Alternatively, a separate test gas flow source may be provided.

Preferably, the hole monitor is co-located with the laser source and focusing system, for example in a common working head and/or mounted upon or integral with a housing for the source and focusing system.

By analogy in this embodiment, the method comprises the additional steps of:
measuring, subsequent to creation of a hole, at least one hole property, for example a property relating to the hole profile and/or to the airflow behaviour of the hole;
comparing the said hole property with a target hole property;
feeding back the results of this comparison to effect control of process parameters of the laser beam on drilling a subsequent hole so as to tend to bring the property for the subsequent hole more closely into approximation with target hole property data.

In particular preferably process parameters controlled in the controlling step are selected from at least the power, duration and focus of a beam incident upon a surface of sheet material in use and the temporal energy distribution. Thus, the properties of a subsequent hole may be varied by control of such process parameters so as to tend to bring the property for the subsequent hole more closely into approximation with target hole property data.

The invention will now be described by way of example only with reference to FIGS. 1 to 3 of the accompanying drawings, in which.

Figure 1:
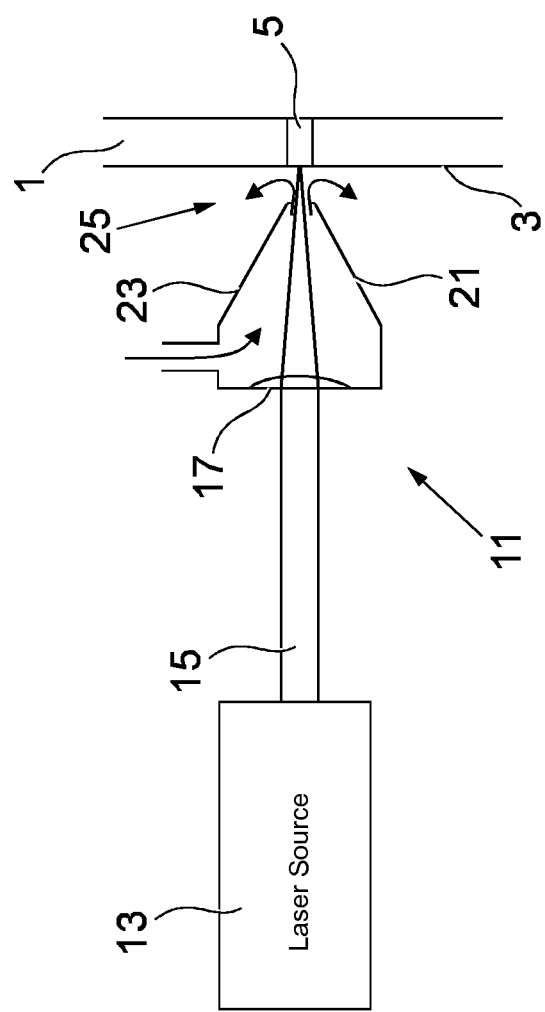
FIG. 1 is a schematic cross section through a laser drilling head and workpiece illustrating an embodiment of the invention.

Referring first to FIG. 1, the embodiment illustrates a laser drilling head 11 many of the components of which will be familiar from conventional laser drilling systems.

A source of coherent laser radiation 13, which in the illustrated embodiment comprises a Nd-YAG laser source operating in the example at a wavelength of 1064 nm generates a beam of laser light 15 which is capable of being pulsed at an appropriate pulse rate and pulse energy. A focusing system 17 focuses the beam onto a selected area of a workpiece 1.

In the illustrated embodiment, the workpiece 1 comprises a sheet of aerospace alloy material into which it is desired to drill a plural array of nominally identical microholes. Typical microholes in this embodiment or generally, might have for example with a nominal diameter of the order of 10 to 100 µm, and more preferably less than 50 µm. Such an array of microholes is used for example as a means of modifying laminar flow across the sheet when the sheet is used in an aerospace structure. The sheet is therefore for example of a suitable aluminium or titanium aerospace alloy. However, it will be appreciated that this workpiece is illustrative only, and that the apparatus is not limited in its applicability to such materials.

The beam is focused onto a surface 3 of the sheet material 1 such as to remove material from the sheet generally in the region of the volume 5 by laser ablation and/or vaporisation so as to create a microhole as above described in the sheet. The laser is a pulsed laser source, and is pulsed at an appropriate rate. This may be used in conjunction with an indexing relative movement of the workpiece 1 and the head 11, to produce by successive operation as above an array of holes across the surface of the workpiece. Alternatively holes may be drilled whilst the workpiece is moving.

The laser source 13 and focusing means 17 are compactly associated together in a head 11 by means of the housing walls 21. A forward surface 23 of the housing wall 21 comprises an annular apertured portion through which the focused beam 15 may be directed onto the workpiece 1. The annular apertured portion additionally defines a nozzle through which an argon gas jet may be directed to impinge upon the surface of the workpiece and clear debris from the surface and/or keep the forward part 23 of the working head free of accumulation of debris. In the configuration as shown, in the initial stages of drilling of a hole, the jet clears debris in the manner of the arrows 25. Subsequently in the drilling process, the jets may assist in clearing the hole, by passing through it.

In the illustrated embodiment, at least the annular forward nozzle portion 23 of the housing of the head is fabricated from a low adhesion polymeric material such as PTFE. Such a low adhesion material may facilitate in preventing the build up of drilling debris on the forward part of the working head. As this material is a dielectric material, it is not possible to use capacitive coupling between the head and the workpiece as a means of measuring distance dynamically during operation, for example to assist in focusing, in the manner often used with laser cutting devices. Consequently therefore, by way of alternative in the illustrated embodiment, an optical measuring device is provided, in the example in the form of a simple laser ranger finder 27, which is capable of directing a measurement beam of radiation at the surface of the workpiece in the vicinity of the volume to be drilled in order to determine the distance between the working head and the workpiece. The measurement device might be contained within the nozzle or might be external to it or might be partially contained within the nozzle.

It should be appreciated that the drilling process generates intense light from several sources, including reflections of the incident drilling laser beam, emissions from the plasma of vapourised metal and gasses in the vicinity of the hole and emissions from molten ejecta from the hole. This light may interfere with the correct operation of optical distance measuring devices such as the laser ranger finder 27 of the example or other optical devices. A way to counteract this is to synchronise the operation of the optical measuring device with a period where the incident drilling laser beam is not operative.

For example, in one possible approach operation of the optical measuring device is synchronised with the "dark periods" that occur between the drilling of each hole. This may be accomplished by switching of the measurement device and/or by inserting an optical shield during the "bright periods". Optical shields could be mechanical (such as the rotating shutters used on movie projectors) or electronic (such as LCD filters/shutters). Both means may be required depending on the response characteristics of the measuring device.

An alternative method is to scan the locus of the row to be drilled with the laser not operating, to store the surface position (distance) as a function of location along the row, then to use this data to control the focus mechanism during a second scanning movement when the laser is operating and drilling.

Other forms of distance measurement could be envisaged. For example, a mechanical or acoustic range finder may be used in association with the head. Alternatively, a distance measurement system may be associated with the actuation means (see FIG. 2) which effect relative movement between the workpiece support 7 and the working head 11, or some additional registration or measurement system may be employed to otherwise measure this distance. Another method for measuring the distance of the workpiece might be to use a device based on air gap gauging. This could be a separate device or could use the nozzle and its associated gas jet as part of the gauging means.

In all cases, in accordance with this embodiment, the intention is to provide an active measurement of distance between a reference datum which is fixed relative to the source 13 (and in the specific embodiment fixed on the working head) and the surface 3 of the workpiece 1). Dynamic measurement of this distance in process allows dynamic focus control as explained in more detail with reference to FIG. 2.

In the illustrated embodiment, a further aspect of dynamic, in-process control is conferred by the unit 29 which is adapted to take observational readings of the properties of each drilled hole or group of holes once it is drilled. In the illustrated embodiment, the unit 29 comprises a flow meter device which monitors the flow characteristics of the gas flow 25 through the hole once it has been drilled. Other monitoring devices capable of monitoring the flow characteristics of a drilled hole in other ways, or capable of measuring their dimensional profile, might be considered as additional or alternative means.

Figure 2:
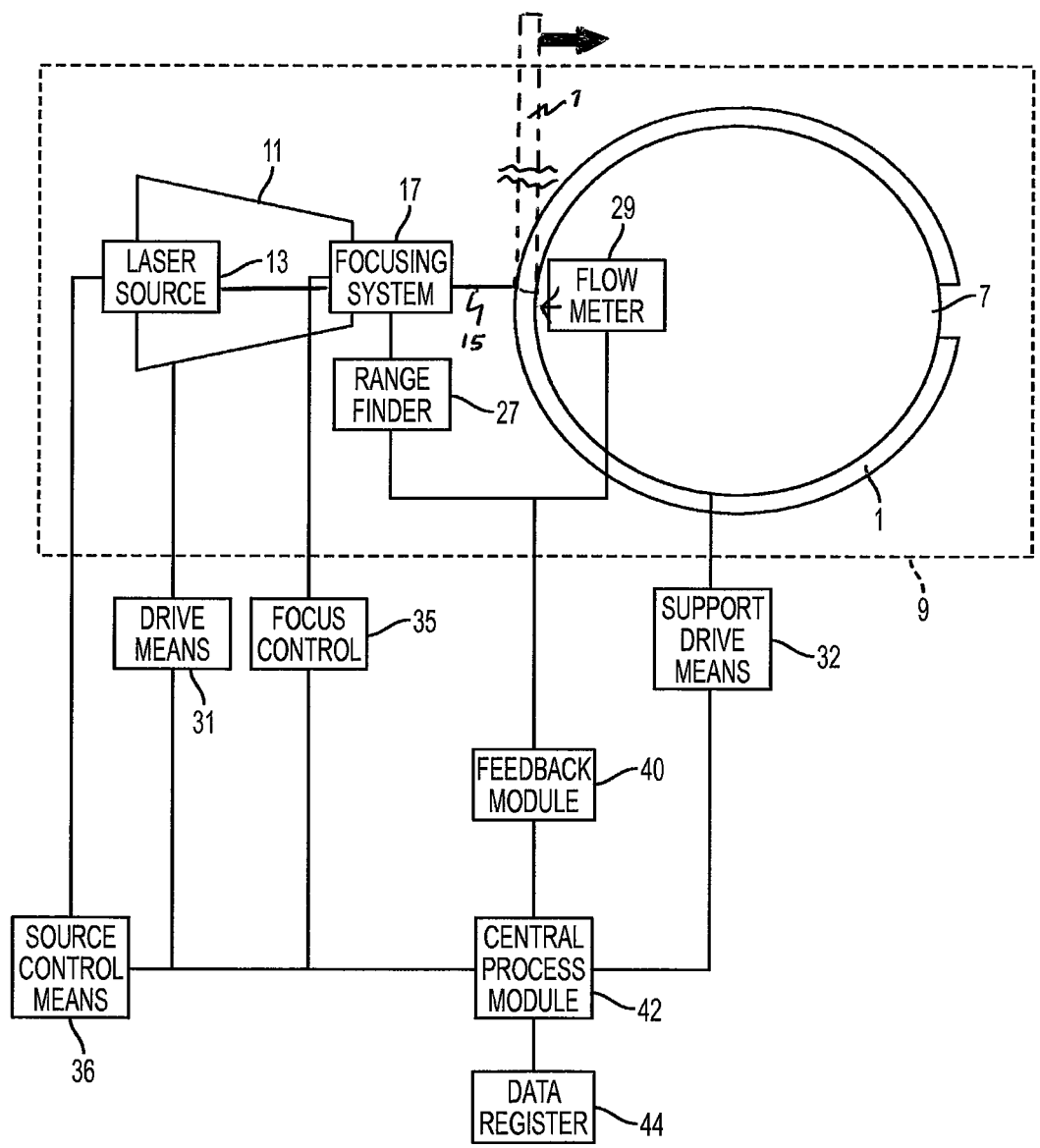
FIG. 2 is a schematic of a more complete system incorporating the head and workpiece of FIG. 1 and illustrating an embodiment of the invention.

A system incorporating the head and workpiece of FIG. 1 is illustrated in more detail in the schematic of FIG. 2.

First, it can be noted in FIG. 2 that a workpiece 1 is supported on a workpiece support 7. The workpiece support 7 comprises a cylindrical drum structure, by virtue of which the workpiece 1 is mounted in a similarly cylindrical manner. A sheet mounted in this manner has inherently greater rigidity, for a given level of support, than would be the case for a simple planar sheet, and is therefore less prone to flexing and distortion on impingement of the pressurised jets 25. It also tends to mitigate buckling and resultant "oil canning" which can take place due to the build up of tensile stress in the plane of the sheet as a result of contraction of molten material during cooling.

The arrangement is substantially enclosed within an environmental enclosure 9 which is intended largely to isolate at least the parts illustrated from the external environment, in particular to allow recirculation of the relatively expensive argon flush gas by means of suitable gas collection and recirculation apparatus (not shown). During the recirculation process, the gas may be scrubbed to remove debris products from the drilling process. This isolation reduces gas wastage, and reduces contamination of the external environment. Another advantage of the enclosure is that it prevents exposure of personnel to laser radiation during normal operation. This is a safety feature and avoids the need to wear eye and body protection except when covers are removed.

FIG. 2 also illustrates schematically the control systems which are used.

The workpiece support 7 and the drilling head 11 are cooperably mounted together by a suitable mounting framework (not shown) in such manner as to allow relative movement between them, at least to allow an indexing relative motion in an x, y plane perpendicular to the direction of the laser beam, and to allow variation of the distance in a z direction between the head and the workpiece. Mechanical drive means 31 and 32 respectively control the head and the support. Either or both drive means may allow motion in an x, y or z direction. The support drive means 32 may allow rotation of the support 7. The laser head drive means 31 may allow tilt of the laser.

Further control means 35 and 36 control the laser beam. A source control means 36 controls the laser source itself, for example controlling pulse rate and power output. A suitable pulse rate for typical laser drilling applications might be 20 to 200 Hz and for example 50 Hz, and a suitable power output might be 1 J per pulse. A focus control means 35 controls the focusing system 17. The control means are under control of a control module 42 in a central processing unit.

In the illustrated embodiment, there is provided in process control of the process parameters set by the control means by way of feedback from measurements made during processing to the control system. In the example this is done in two illustrated ways. For each drilling operation, data from the range finder 27 and data from the flow meter 29 are passed to a feedback module 40. The feedback module 40 compares this with reference data for desired processing parameters, and feeds correction instructions to the central process control 42, which acts on the various control means 31, 32, 35, 36 to adjust the control parameters as necessary to ensure that successive drilled holes have the desired properties.

A data register 44 is provided in which may be stored reference process parameters, for example for desired hole distribution and shape, to enable the apparatus to print a desired array. Another purpose of the register may be to provide look-up data for the process.

Any suitable form of control module and/or feedback module and/or process parameter data register can be envisaged, for example combining suitable hardware and software and combining automatic and user-input control steps. For example a control module and/or feedback module and/or process parameter data register comprises a suitably programmed data processing apparatus such as a suitably programmed general purpose or special purpose computer.

It will also be understood generally that a numerical or data processing step in the method of the invention can be implemented by a suitable set of machine readable instructions or code. These machine readable instructions may be loaded onto a general purpose computer, special purpose computer, or other programmable data processing apparatus to produce a means for implementing the step specified.

These machine readable instructions may also be stored in a computer readable medium that can direct a computer or other programmable data processing apparatus to function in a particular manner, such that the instructions stored in a computer readable medium produce an article of manufacture including instruction means to implement some or all of the numerical or data processing steps in the method of the invention. Computer program instructions may also be loaded onto a computer or other programmable apparatus to produce a machine capable of implementing a computer executed process such that the instructions are executed on the computer or other programmable apparatus providing steps for implementing some or all of the numerical steps in the method of the invention. It will be understood that a step can be implemented by, and a means of the apparatus for performing such a step composed in, any suitable combinations of special purpose hardware and/or computer instructions.

Figure 3:
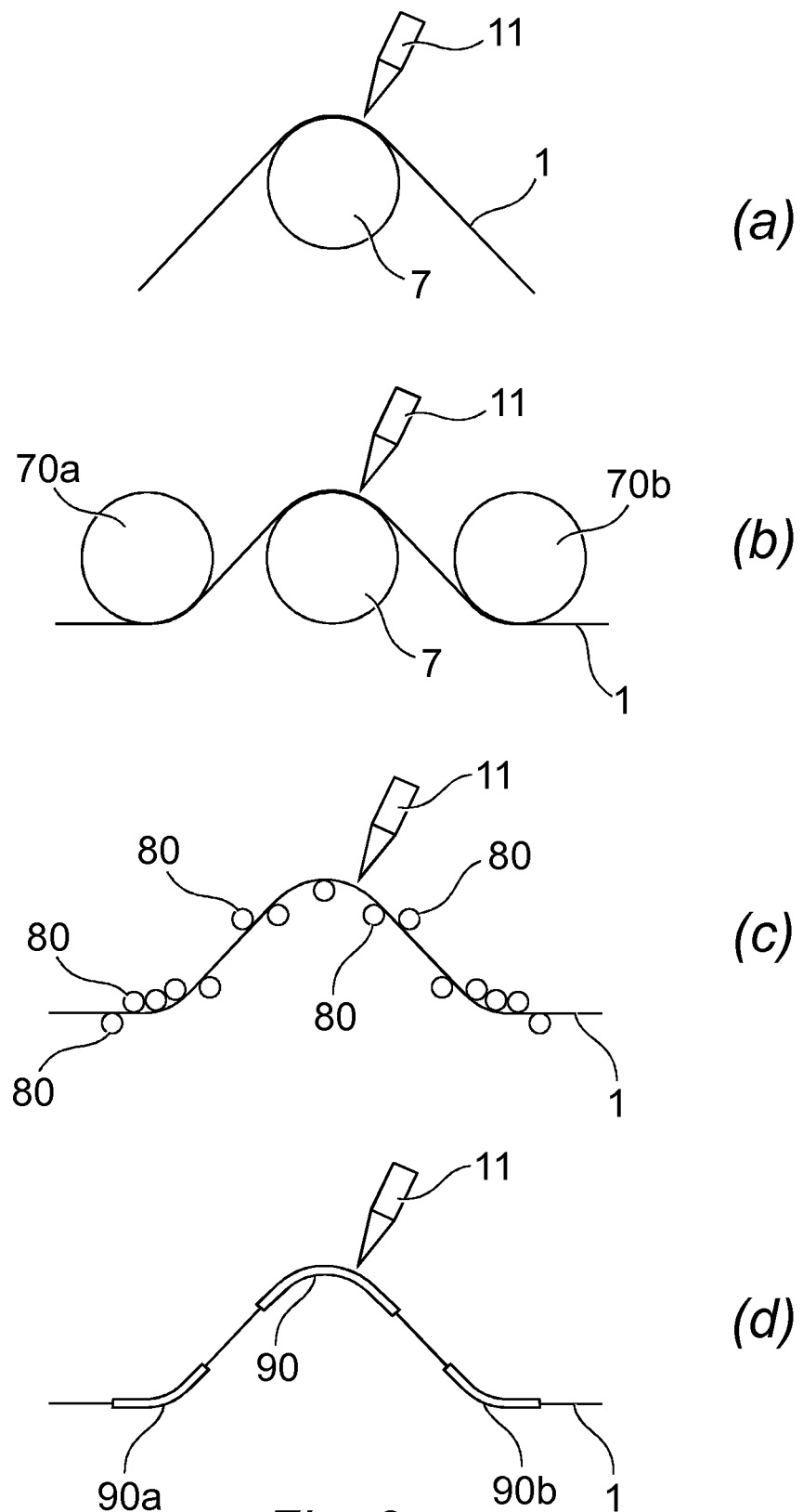
FIG. 3 is a schematic of alternative embodiments of a workpiece support of the invention.

Referring to FIG. 3, alternative support arrangements for a workpiece 1 are shown.

In the support arrangement depicted in FIG. 3*a*, the workpiece support 7 comprises a cylindrical drum structure. However, rather than the workpiece 1 being substantially wrapped around the cylindrical drum structure as in the arrangement of FIG. 2, the workpiece 1 is partially wrapped around the cylindrical drum and held in an arcuate configuration at the drilling location.

In the arrangement depicted in FIG. 3*b*, an additional cylindrical drum structure 70*a*, 70*b* is employed upstream and downstream of the drilling location.

In an alternative arrangement, rather than a cylindrical drum structure, the workpiece support comprises a plurality of rollers 80 arranged to hold the workpiece in an arcuate configuration at the drilling location. The positions of the rollers 80 can be arranged such that the worksheet takes a profile similar to that depicted in FIG. 3*a* or as depicted in FIG. 3*b* as shown in FIG. 3*c*.

In another arrangement, the workpiece support comprises a guide 90 adapted to hold the workpiece 1 in an arcuate configuration at the drilling location (see FIG. 3*d*). Further guides 90*a*, 90*b* may be employed as shown if additional support is required to support the workpiece 1 upstream or downstream of the drilling location.

It would be understood by a person skilled in the art that various alternative workpiece support configurations which are adapted to hold the workpiece in an arcuate configuration at the drilling location are possible and that the arrangements described above are a sample of such arrangements.

Figure 4:
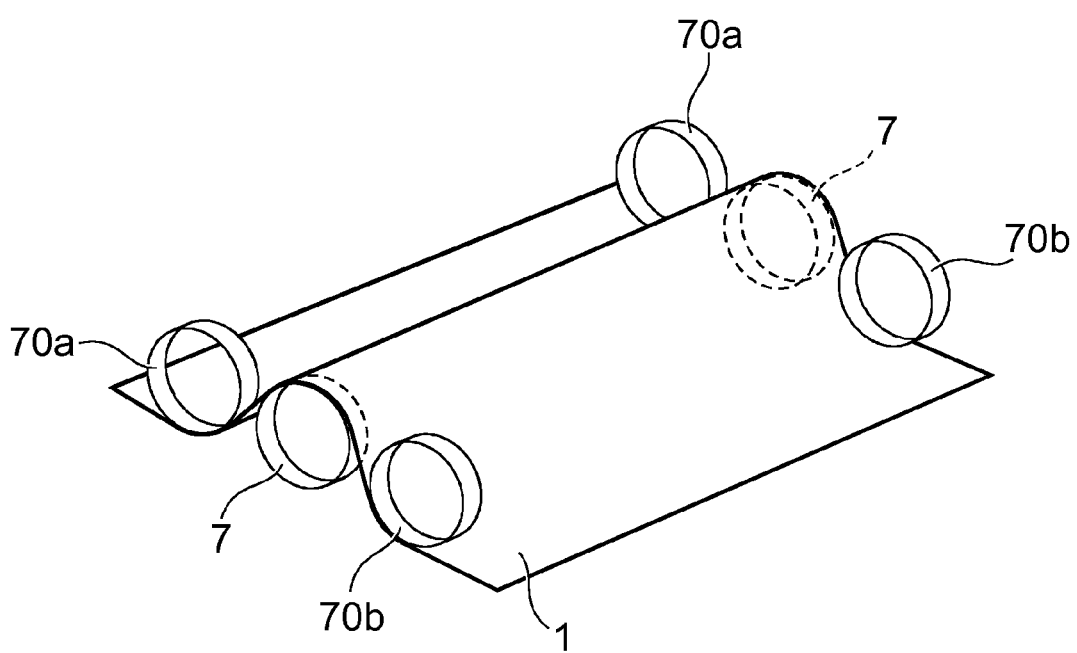
FIG. 4 is a perspective view of an embodiment of a workpiece support arrangement of the invention.

Due to the inherently greater rigidity of the workpiece for a given level of support, than would be the case for a simple planar sheet, that the arcuate configuration at the drilling location provides, it is not necessary for the workpiece to be supported across its entire surface at the drilling location. Support of the workpiece is only required at the edges as shown in FIG. 4, which corresponds to the workpiece support arrangement of FIG. 3*b*. Supporting the workpiece only at the edges means that both sides of the workpiece are clear of obstacles that would either constrain the access of the laser source 13 or the flow meter 29 or other sensors.

Figure 5A:
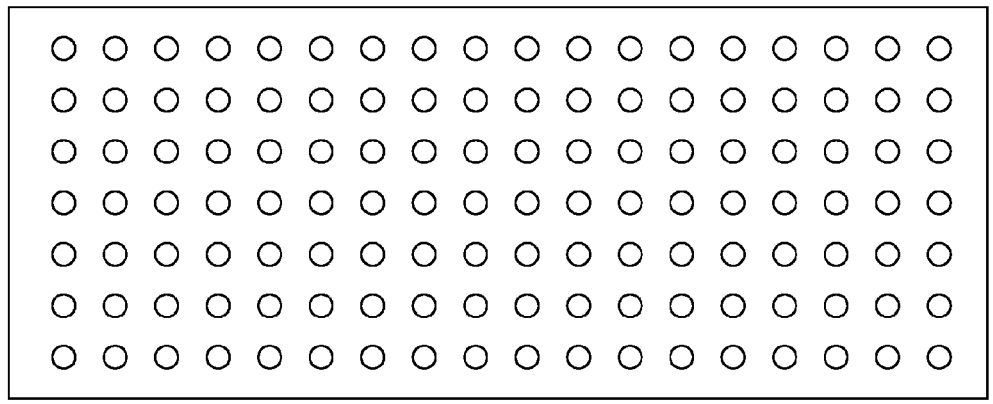
FIG. 5 illustrates example patterns of arrays of drilled holes.
Figure 5B:
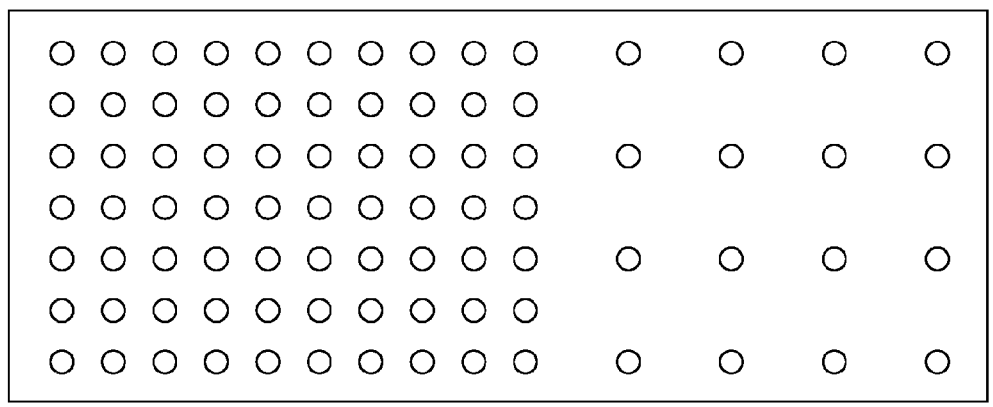

Some examples of desired arrays which might be produced are illustrated in FIGS. 5*a* and 5*b*. FIG. 5*a* is an example of a simple arrangement of a square array of constant spacing. FIG. 5*b* illustrates an arrangement where two separate areas have been defined in a surface, and discrete array patterns have been provided therein. These should be seen as schematic and illustrative only. In particular, while there might be occasions where it is desirable to provide an array with order in two dimensions, for example in square or hexagonal patterns, for the most part holes are drilled with a controlled row spacing and a controlled spacing of holes along each row, but, except where specifically required, it will not usually be necessary control the alignment of holes from row to row to produce such a pattern. Hence although there are the same number of holes in any given real pattern area as in the illustration, a more typical pattern might be random as far as row to row alignment is concerned.

The invention claimed is:

1. A solid sheet metal drilling apparatus for creating a hole in a solid sheet metal material by laser beam irradiation, the apparatus comprising:
    a source of laser radiation;
    a focusing apparatus for impinging a beam of laser radiation from the source onto a surface of the solid sheet metal material in which holes are to be formed in use;
    a holding device for holding said solid sheet metal material; wherein the holding device is structured to hold the solid sheet metal material in use in an arcuate configuration at a drilling location; and
    wherein the solid sheet metal drilling apparatus is configured to support the solid sheet metal material in use only at edges of the solid sheet metal material.

2. The apparatus in accordance with claim 1, wherein the source of laser radiation is arranged in use to deliver a beam of laser radiation in a direction substantially perpendicular to a longitudinal axis of the solid sheet metal material.

3. The apparatus in accordance with claim 1, wherein the source of laser radiation is arranged in use to deliver a beam of laser radiation at an angle of between 10 and 90 degrees to a tangent of an apex of the solid sheet metal material.

4. The apparatus in accordance with claim 1, wherein the holding device is structured to hold the solid sheet metal material relative to the source of laser radiation in use such that a beam of laser radiation deliverable from the source in a direction substantially parallel to a thickness of the solid sheet metal material.

5. The apparatus in accordance with claim 1, wherein the holding device is structured to hold the solid sheet metal material in use in an arcuate configuration at the drilling location via a bending force applied in a direction substantially parallel to a beam of laser radiation deliverable from the source.

6. The apparatus in accordance with claim 1, further comprising an environmental enclosure that defines a substantially fluidly isolated environment.

7. The apparatus in accordance with claim 1 further comprising:

a distance measurement device to measure distance between a point in fixed relationship to the source of laser radiation and a surface of the solid sheet metal material; and a control module that adjusts beam focus dynamically to focus the laser beam based on measurement of distance obtained by the distance measurement device.

8. The apparatus in accordance with claim 1 further comprising:
a control module to control process parameters relating to an incident beam including at least power, duration and focus of a beam incident upon a surface of sheet material in use;
a hole monitor adapted to obtain hole property data relating to at least one of a profile and airflow behaviour of a hole, as each hole is created; and
a feedback module including a data link to receive hole property data, a comparator to compare hole property data with target data relating to a desired profile/airflow, and a control signal output to output a control signal based on a comparison to the control module to cause the control module to tend to vary process parameters in such manner as to bring hole properties into closer correlation with target hole property data.

9. The apparatus in accordance with claim 1, wherein the holding device is mounted to be rotatable about a longitudinal axis so as to enable different portions of the surface of the solid sheet to be presented selectively to the laser radiation.

10. The apparatus in accordance with claim 1, wherein the holding device is mounted cooperably with the laser source to enable relative movement between the surface of the solid sheet and the laser source so as to allow the laser beam to impinge selectively on different areas of the surface of the solid sheet.

11. The apparatus in accordance with claim 1, wherein the holding device is mounted cooperably with the laser source so as to permit variation of a relative distance between them in a direction parallel to a beam direction.

12. The apparatus in accordance with claim 1, wherein the holding device is demountable from the apparatus for loading and unloading of the solid sheet metal material.

13. The apparatus in accordance with claim 1, wherein the laser source is adapted to deliver pulsed radiation onto the surface of the solid sheet metal material to be drilled.

14. The apparatus in accordance with claim 1, wherein the laser source is a Nd:YAG laser.

15. The apparatus in accordance with claim 1, further comprising an inert gas jet source for blowing a gas jet under pressure across the surface of the solid sheet metal material in a vicinity of a volume in which a hole is being formed.

16. The apparatus in accordance with claim 1, wherein the holding device is structured to hold the solid sheet metal material in use in the form at least one of a cylindrical surface and a part thereof.

17. The apparatus in accordance with claim 16, wherein the holding device comprises at least one of a cylindrical drum and a part thereof.

18. The apparatus in accordance with claim 16, wherein the holding device comprises a guide.

19. A method of creating a hole in a solid sheet metal material by laser beam irradiation, the method comprising:
mounting the solid sheet metal material on a holding apparatus such that the solid sheet metal material is held in an arcuate configuration at a drilling location;
irradiating a surface of the solid sheet metal material with a beam of laser radiation to drill a hole therethrough by at least one of an ablation and vaporisation of the solid sheet metal material; and
wherein the solid sheet metal material is supported only at edges of the solid sheet metal material.

20. The method in accordance with claim 19, further comprising the steps of:
measuring a distance between a fixed point associated with a source of radiation and the surface of the solid sheet metal material; and
irradiating a surface of the solid material with a beam of laser radiation directed thereupon from the source of radiation, the beam having been focused in accordance with the measurement of the distance so obtained.

21. The method in accordance with claim 19, wherein the beam of laser radiation is delivered in a direction substantially perpendicular to a longitudinal axis of the solid sheet metal material.

22. The method in accordance with claim 19, wherein the beam of laser radiation is delivered at an angle of between 10 and 90 degrees to a tangent of an apex of the solid sheet metal material.

23. The method in accordance with claim 19, wherein the solid sheet metal material is held such that the beam of laser radiation is delivered substantially parallel to a thickness of the solid sheet metal material.

24. The method in accordance with claim 19, wherein the solid sheet metal material is held in an arcuate configuration at the drilling location via a bending force applied in a direction substantially parallel to the beam of laser radiation.

25. The method in accordance with claim 19, further comprising the steps of:
measuring, subsequent to creation of a hole, at least one hole property relating to at least one of a hole profile and an airflow behaviour of the hole;
comparing the hole property with a target hole property; and
feeding back results of the comparison to effect control of process parameters of the laser beam on drilling a subsequent hole so as to tend to bring the property for the subsequent hole more closely into approximation with target hole property data.

26. The method of drilling a plurality of holes in the solid sheet metal material comprising the steps of claim 19 repeated a large plurality of times to drill a plural array of holes.

27. The method in accordance with claim 26, wherein pulsed laser irradiation is successively impinged onto the surface of the solid sheet metal material at a plurality of multiple locations to drill such a plurality of holes.

28. The method in accordance with claim 26, further comprising the step of relative movement of a laser source and a sheet surface between each drilling step so as to drill a plurality of holes.

* * * * *